United States Patent Office 3,553,293
Patented Jan. 5, 1971

3,553,293
PRODUCT AND A METHOD OF IMPROVING THE SHELF LIFE OF UNCURED POLYESTER RESINS
Eldon E. Stahly, Ellicott City, and Edwin W. Lard, Bowie, Md., assignors to W. R. Grace & Co., New York, N.Y., a corporation of Connecticut
No Drawing. Filed Dec. 10, 1968, Ser. No. 782,709
Int. Cl. C08f 21/02, 45/58
U.S. Cl. 260—866
10 Claims

ABSTRACT OF THE DISCLOSURE

Dihydroxynaphthaquinones are added to uncured polyester resin systems to prevent gelation of those systems when they are stored at room temperature or at elevated temperatures for periods of time in excess of three years. Between 0.5 and 1.0 mole percent of the dihydroxynaphthaquinone is added to the uncured polyester systems.

BACKGROUND OF THE INVENTION

The invention herein described was made in the course of or under a contract or subcontract thereunder, with the Department of the Air Force, Department of Defense.

(1) Objectives of the invention

It is an object of this invention to prevent the gelation of admixtures of uncured polyester components during the prolonged periods of storage at room temperatures and at elevated temperatures. Other objects will be obvious.

(2) Prior art

Conventional inhibitors are added in amounts up to about 0.0005 mole percent to preserve polyester resins in the liquid unpolymerized stage at temperatures of 77° F. and higher, but the maximum shelf life is about six months.

BROAD DESCRIPTION OF THE INVENTION

This invention, broadly, involves a method of prolonging the useful life of uncured polyester resin compositions by preventing the gelling and cross-linking thereof during storage, normally at ambient temperatures. That result can be achieved by incorporation between about 0.5 and about 1.0 mole percent of the novel inhibitors of this invention into uncured polyester resin compositions. Those stabilized uncured polyester resin compositions can be stored and maintained in useful unpolymerized fluid form for periods up to 3 years or more at 70° C. and for periods from 3 to 30 years at 25° to 50° C. Of course, temperatures below 15° C. and as high as 135° C. can be used.

The novel process of this invention for prolonging the storage life of uncured polyester resin compositions by preventing the gelling of those polyester resin compositions includes admixing an inhibitor selected from the group consisting of:

2-hydroxyl-1,4-naphthoquinone,
5-hydroxy-1,4-naphthoquinone,
2-hydroxy-3-methyl-1,4-naphthoquinone,
5-hydroxy-2-methyl-1,4-naphthoquinone,
2,3-dihydroxy-1,4-naphthoquinone,
2,5-dihydroxy-1,4-naphthoquinone,
2,6-dihydroxy-1,4-naphthoquinone,
2,7-dihydroxy-1,4-naphthoquinone,
2,8-dihydroxy-1,4-naphthoquinone,
5,6-dihydroxy-1,4-naphthoquinone,
5,8-dihydroxy-1,4-naphthoquinone,
2,8-dihydroxy-3-methyl-1,4-naphthoquinone,
2,5,7-trihydroxy-1,4-naphthoquinone,
2,5,8-trihydroxy-1,4-naphthoquinone,
2,5,8-trihydroxy-3-methyl-1,4-naphthoquinone,
2,3,5,8-tetrahydroxy-1,4-naphthoquinone,
2,3,5,6,8-pentahydroxy-7-ethyl-1,4-naphthoquinone, and an uncured polyester resin composition. The preferred inhibitor is 2-hydroxy-1,4-naphthoquinone or 5-hydroxy-1,4-naphthoquinone.

The examples below bear out the fact that conventional amounts (0.00001 to 0.001 mole percent) of inhibitors (also termed a "free radical" scavenging type of cross-linking inhibitor) were found inadequate for storage for periods of time longer than six months. Amounts larger than normally used by the art (up to 1 mole percent) were tested for comparison with the new stable formulations of this invention, however, the conventional stabilizers were found very inferior even at those high concentrations. A one-thousand fold increase in the conventional concentration (0.001 weight percent) of those additives imparts less than a one year shelf-life increase to the uncured polyester resin compositions at 50° C.

Preferably, the smallest amount of inhibitor found to be effective for storage stability is used so that the composition can be easily cured after the storage period.

This invention also includes the addition of the above said inhibitors when combined with (i.e., dissolved in or admixed with) isopropanol to the uncured polyester resin compositions. The resultant stabilized compositions also have shelf-lives in excess of three years at preferred temperatures below 15° C. and about 70° C. Of course, storage temperatures below 15° C. and as high as 135° C. can be used. The isopropanol is strongly synergistic, allowing less than 0.5 mole percent of the novel inhibitors to be dissolved in or admixed with between about 0.1 and about 3.5 mole percent isopropanol.

This invention further includes the uncured polyester resin compositions including the inhibitor, or inhibitor and isopropanol, in the above stated amounts.

The stabilized uncured polyester resin compositions of this invention can be cured and crosslinked to form strong laminates, resin composites and other cured resinous materials.

DETAILED DESCRIPTION OF THE INVENTION

As used within the scope of this invention, an inhibitor is a material whose primary function is to prevent or retard internal polymerization of the polyester constituent of the resinous composition. An alternative term for an inhibitor, as used herein, is the term stabilizer (which is the term more conventionally used by the art).

Specific examples of useful inhibitors are given as follows:

(a) 2-hydroxy-1,4-naphthoquinone is also termed 2-hydroxy-α-naphthoquinone, is soluble in alcohol and ether, and is slightly soluble in hot water. It can be prepared by oxidizing 1,2-naphthoquinone with hydrogen peroxide. It has the following structural formula:

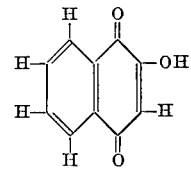

(b) 5-hydroxy-1,4-naphthoquinone can be prepared by oxidizing 1,8-dihydroxynaphthalene with chromic acid. It has the following structural formula:

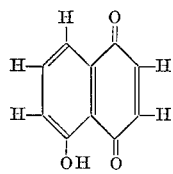

(c) 2-hydroxy-3-methyl-1,4-naphthoquinone from 2-hydroxy-1,4-naphthoquinone with diacetyl peroxide. It has the following formula:

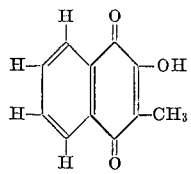

Homologous 2-hydroxy-3-alkyl compounds can be obtained from the next higher homologue by oxidation with dilute $KMnO_4$;

(d) 5 - hydroxy - 2 - methyl - 1,4-naphthoquinone can be prepared by oxidizing 2-methyl-1,4-naphthoquinone with ammonium persulphate. It has the following structural formula:

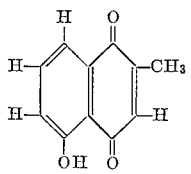

(e) 2,3 - dihydroxy - 1,4 - naphthoquinone can be prepared from 2-hydroxy-1,4-naphthoquinone with hydrogen peroxide. It has the following structural formula:

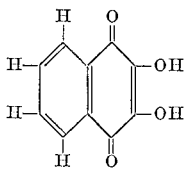

(f) 2,5 - dihydroxy - 1,4 - naphthoquinone, which has the following structural formula:

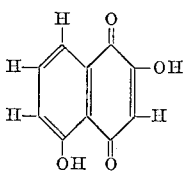

(g) 2,6 - dihydroxy - 1,4-naphthoquinone, which has the following structural formula:

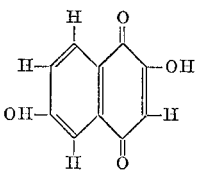

(h) 2,8-dihydroxy-1,4-naphthoquinone can be prepared by oxidizing juglone. It has the following structural formula:

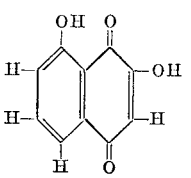

(i) 5,6-dihydroxy-1,4-naphthoquinone, which has the following structural formula:

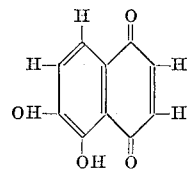

(j) 5,8-dihydroxy-1,4-naphthoquinone can be synthesized from hydroquinone and maleic anhydride with $AlCl_3$ at 200° C. It has the following structural formula:

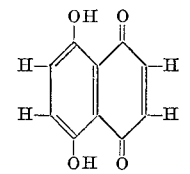

(k) 2,8 - dihydroxy - 3 - methyl - 1,4-naphthoquinone is synthesized from 2,8-dihydroxy-1,4-naphthoquinone with acetyl peroxide. It has the following structural formula:

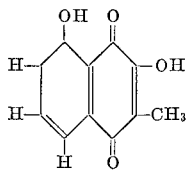

(l) 2,5,7 - trihydroxy - 1,4 - naphthoquinone is crystallized out from hot dioxan. It has the following structural formula:

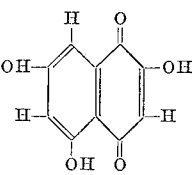

(m) 2,5,8 - trihydroxy - 1,4 - naphthoquinone is prepared from naphthazarin in alkaline solution by oxidation with air. It has the following structural formula:

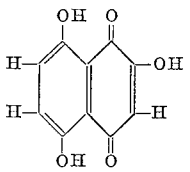

(n) 2,5,8-trihydroxy - 3 - methyl - 1,4-naphthoquinone occurs naturally in *Drosera whittakeri*. It has the following structural formula:

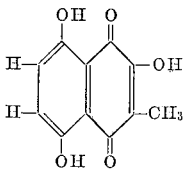

(o) 2,3,5,8 - tetrahydroxy - 1,4 - naphthoquinone, which has the following structural formula:

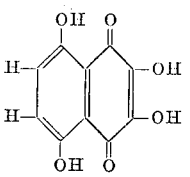

and (p) 2,3,5,6,8 - pentahydroxy - 7 - ethyl-1,4-naphthoquinone, which has the following structural formula:

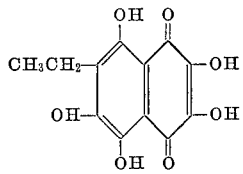

Shelf-life tests for evaluation of polyester resins containing various amounts of inhibitors are tedious and impractically long at the usual storage temperatures of 50° to 140° F. (10° to 40° C.). By use of Arrhenius-type relationships it is possible and practical to use accelerated tests at higher temperatures to rapidly obtain storage data. By extrapolation of a plot of the data, storage times can be predicted for any lower temperature. The Arrhenius equation $k=Ae^{-E/RT}$ reduces to log $$k=C-\frac{E}{2.303RT}$$

where $k$=rate of crosslinking of the resin at temperature $T$ (°K.), E=energy of activation in K cal./mole and R=1.987 cal. The rates of crosslinking (i.e., gelling) of polyester resin formulations of Examples 1 through 5 when plotted on semi-log paper (log $k$ vs. $1/T$) fall on a straight line for the temperature range 70° to 150° C. (158° to 302° F.). This straight-line relationship establishes the fact that the mechanism of the gelling reaction does not change over the temperature range of interest, and the slope of the line$=-E/2.303R$, and $E$, the activation energy of the gelation, can be calculated for each resin. It is possible to simplify extrapolation of the storage life at elevated temperatures by a route which by-passes calculation of the reaction rate. The change in viscosity which occurs in the crosslinking and conversion of the fluid polyester into a non-flowable gel is substantially constant for each particular polyester formulation. Therefore, the rate of cross-linking expressed in terms of rate of change of viscosity (i.e., $\Delta$ viscosity/time) becomes $C$/time where C is constant. When log $1/t$ (time) is plotted against $1/T°$ K., a line is obtained having a slope identical with that of the line represented by $1/T°$ K. versus log $k$. It is convenient to plot the colog of $1/t$ or log (time) itself and a line of the same slope but of opposite sign is obtained ($t$=time for gelation to occur). Extrapolation of the straight line obtained from log $t$ (time to gel) versus $1/T(°$ K.) can be extrapolated to any $1/T$ value required. The use of accelerated storage tests based on this use of higher temperatures, enables a fast laboratory determination of whether or not the inhibitors prevent "setting" of polyester resins prior to combination with a catalyst curing system for end use applications.

The preferred temperature range for the storage of the stabilized uncured polyester resin compositions is about 15° to about 70° C. Temperatures below 15° C. are not ordinarily used because of the costs of maintaining those temperatures over long periods of time. Temperatures as high as 125° C. to 135° C. are useful; but the storage life is decreased from those obtained when the preferred temperature ranges are utilized.

Various useful polyester resin compositions are given in the following paragraphs.

The preferred unsaturated polymerizable mixtures to be cured by the process of this invention are conventional classes of resins known in the prior art. The most preferred polyester resins are prepared by the esterification of alpha, beta-unsaturated polybasic acids, and dihydric alcohols. Certain compounds of this type may be indicated generically as follows: —M—G—M—G—M—G where, —M— represents an unsaturated dibasic acid residue and —G— represents a dihydric alcohol residue. Modifying dibasic acids may also be used in the polyester resin compositions. Representative dihydric alcohol and unsaturated polybasic acids are shown below.

In preparing unsaturated polyesters which may be employed in the practice of the present invention, the alcohol component may comprise ethylene glycol, diethylene glycol or propylene glycol, or one of the group of solid polyethylene glycols designated as "Carbowax."

Polyethylene glycols such as the "Carbowaxes" are understood to have molecular weights above 300. Those most useful for this invention have weights below 4000 and preferably are in a range of about 1000 to 2000, e.g., 1500.

The acid component usually comprises an alpha, beta-ethylenically unsaturated polycarboxylic acid such as maleic, fumaric or itaconic acid, or the well-known derivatives of these polycarboxylic acids having ethylenic unsaturation in alpha-beta relation to the carboxyl group. Polybasic acids such as aconitic acid, tricarballylic acid or citric acid may also be employed. A plurality of such acids also may be mixed with each other, if so desired. In many instances, it may be desirable to include a dicarboxylic acid free of ethylenic unsaturation. Examples of this latter type of dicarboxylic acid include phthalic acid or terephthalic acid, which, although they contain double bonds in the benzene ring, do not undergo addition reaction with monomer compounds and may, therefore, be considered as being the equivalent of saturated compounds. Likewise, aliphatic dicarboxylic acids such as succinic acid, adipic acid, sebacic acid, or azelaic acid may be substituted for a part of the alpha, beta-ethylenically unsaturated dicarboxylic acid. The proportion of the non-ethylene acid with respect to the alpha, beta-ethylenically unsaturated acid is susceptible of wide variation. A molecular proportion of 0.25 to 12 moles of saturated acid per mole of unsaturated acid is usually used for commercial applications. Also acid anhydrides of these dicarboxylic acids can be used instead of the dicarboxylic acids.

In preparing the polyester, a small excess (usually 5 or 10 percent) of the dihydric alcohol is usually employed. The conditions of the esterification reaction are those conventionally employed in preparing polyesters. For example, the mixture of the alcohol and the acid is heated in a vented container or under an inert atmosphere until the water of reaction is expelled from the system, which usually occurs in a temperature range of about 150° to 210° C. The reaction is continued until the acid value is reduced to a reasonable low point, e.g., within a range of about 5 to 50, or until the mixture becomes highly viscous or even solid when it is cooled. Usually these conditions are attained in a period of 2 to 20 hours. In an event, the reaction is concluded before the product becomes infusible and insoluble because of the advanced stage of polymerization. The product is then blended with the ethylenically unsaturated monomer in such a manner as to maintain the temperature of the blend below 150° F.

The ethylenically unsaturated monomers may be selected from the following general list:

(1) Monoolefinic hydrocarbons, that is, monomers containing only atoms of hydrogen and carbon, such as styrene, alpha-methyl styrene, alpha-ethyl styrene, alpha-butyl styrene, vinyl toluene, and the like;

(2) Halogenated monoolefinic hydrocarbons, that is, monomers containing carbon hydrogen and one or more halogen atoms such as alpha-chlorostyrene, alpha-bromostyrene, 2,5-dichlorostyrene, 2,5-dibromostyrene, 3,4-dichlorostyrene, 3,4-difluorostyrene, ortho-, meta- and para-fluorostyrenes, 2,6-dichlorostyrene, 2,6-difluorostyrene, 3-fluoro - 4 - chlorostyrene, 2,4,5-trichlorostyrene, dichloromonofluorostyrenes, chloroethylene (vinyl chloride), 1,1-dichloroethylene (vinylidene chloride), bromoethylene, fluorethylene, iodoethylene, 1,1-dibromoethylene, 1,1-difluoroethylene, 1,1-diiodoethylene, and the like.

(3) Esters of organic and inorganic acids such as vinyl acetate, vinyl propionate, vinyl butyrate, vinyl isobutyrate, vinyl avalerate, vinyl caproate, vinyl enanthate, vinyl benzoate, vinyl toluate, vinyl p-chlorobenzoate, vinyl o-chlorobenzoate, vinyl m-chlorobenzoate and similar vinyl halobenzoates, vinyl p-methoxybenzoate, vinyl o-methoxybenzoate, vinyl p-ethoxybenzoate, methyl methacrylate, ethyl methacrylate, propyl methacrylate, butyl methacrylate, amyl methacrylate, hexyl methacrylate, heptyl methacrylate, octyl methacrylate, decyl methacrylate, methyl crotonate, ethyl crotonate and ethyl tiglate, methyl acrylate, ethyl acrylate, propyl acrylate, isopropyl acrylate, butyl acrylate, isobutyl acrylate, amyl acrylate, hexyl acrylate, 2-ethylhexyl acrylate, heptyl acrylate, octyl acrylate, 3,5,5-trimethylhexyl acrylate, decyl acrylate, and dodecyl acrylate, isopropenyl acetate, isopropenyl propionate, isopropenyl butyrate, isopropenyl valerate, isopropenyl caproate, isopropenyl enanthate, isopropenyl benzoate, isopropenyl p-chlorobenzoate, isopropenyl o-bromobenzoate, isopropenyl m-chlorobenzoate, isopropenyl toluate, isopropenyl alpha-chloroacetate and ispropenyl alpha-bromopropionate;

Vinyl alpha - chloroacetate, vinyl alpha - bromoacetate, vinyl alpha - chloropropionate, vinyl alpha - bromopropionate, vinyl alpha - iodopropionate, vinyl alpha - chlorobutyrate, vinyl alpha - chlorovalerate and vinyl alpha-bromovalerate;

Allyl chlorocarbonate, allyl formate, allyl acetate, allyl propionate, allyl butyrate, allyl valerate, caproate, diallyl phthalate, diallyl succinate, diethylene glycol bis(allyl - carbonate), allyl 3,5,5 - trimethlhexoate, allyl benzoate, allyl acrylate, allyl crotonate, allyl oleate, allyl chloroacetate, allyl trichloroacetate, allyl chloropropionate, allyl chlorovalerate, allyl lactate, allyl pyruvate, allyl aminoacetate, allyl acetoacetate, allyl thioacetate, diallyl-3,4,5,6,7,7 - hexachloro - 4 - endomethylene tetrahydrophthalate, as well as methallyl esters corresponding to the above allyl esters, as well as esters from such alkenyl alcohols as beta-ethyl allyl alcohol, beta-propyl allyl alcohol 1-buten-4-ol, 2 - methyl - buten-1-ol-4, 2(2,2-dimethylpropyl)-1-buten-4-ol and 1-pentene-4-ol;

Methyl alpha-chloroacrylate, methyl alpha-bromoacrylate, methyl alpha-fluoroacrylate, methyl alpha-idoacrylate, ethyl alpha - chloroacrylate, propyl alpha - chloroacrylate, isopropyl alpha - bromoacrylate, amyl alpha - chloroacrylate, octyl alphachloroacrylate, 3,5,5-trimethylhexyl alpha - chloroacrylate, decyl alpha - chloroacrylate, methyl alpha - cyano acrylate, ethyl alpha-cyano acrylate, amyl alpha-cyano arcylate, amyl alpha-cyano acrylate and decyl alpha-cyano acrylate;

Dimethyl maleate, diethyl maleate, diallyl maleate, dimethyl fumarate, dimethallyl fumarate and diethyl glutaconate;

(4) Organic nitriles such as acrylonitrile, methacrylonitrile, ethacrylonitrile, crotonitrile, and the like;

(5) Acid monomers such as acrylic acid, methacrylic acid, crotonic acid, 3-butenoic acid, angelic acid, tiglic acid and the like;

(6) Amides such as acrylamide, alpha-methyl acrylamide N-phenyl acrylamide, N-methyl-N-phenyl acrylamide, N-methyl acrylamide, and the like.

The preferred monomers are liquid compounds soluble in the polyester component. They will contain the $C=CH_2$ group and preferably the latter will be attached to a negative radical such as a benzene ring, a chlorine atom, an ester linkage, a nitrile group or the like. They should be free of carbon-carbon conjugated double bonds.

The most preferred polyesters are the burn-resistant type wherein halogenated aromatic acid anhydrides or halogenrated endomethylenecyclohexane dicarboxylic anhydride are added as part of the dibasic acid moiety. See Examples 1 through 5 for this type of polyester resin compositions. The colbat salt promoter can be placed in the polyester resin composition during storage or just before curing.

These polyesters are "burn resistant" by reason of the fact that halogenated components are present so that the total chlorine content is in the range of 25 to 30 percent by weight or the bromine content is about 10 weight percent. The polyesters are either commercial or developmental polyesters and are prepared by esterifying mixtures of dibasic acids and/or anhydrides with a dinctional glycol. Part of the acid moieties are unsaturated, and the final polyester is diluted with styrene. The resin for en-use applications is cured with peroxide catalyst to develop the final cross-linked three-dimensional thermoset product. The esterification process in which those resins are produced, is represented by the following equation:

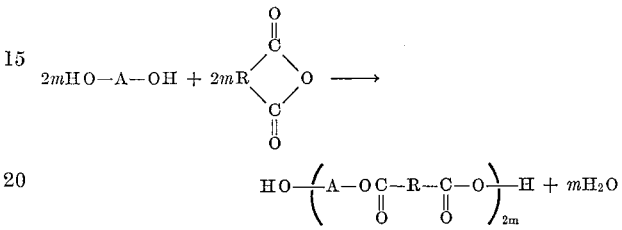

wherein: A is a divalent organic moiety, e.g., alyklene, aralkylene, cycloalkylene, polyalkylene ether, and the like; R is arylene, alkylene, alkenylene, alkarylene, aralkylene and the like (e.g., phenylene, ethylene, ethenylene, methyl phenylene, phenylethylene, etc.); and $m$ is 2 to 10.

In general, monomer component or components may be employed over a relatively broad range, but, usually, the amount thereof upon a weight basis will be less than that of the polyester component. Usually, the percentage of monomer will fall within a range of about 10 to 45 percent by weight of the total mixture of polyester and monomer. The preferred range of monomer is about 20 to 40 percent, in most instances.

The curing time of the polyester resin systems varies between about 1 minute and about 24 hours. This time span depends, in part, upon the type of polyester resin, the amount of catalyst, the amount of inhibitor, and so forth. The curing temperature of the polyester resin systems varies between about 15° C. and about 250° C. Preferably, the polyester resin system can be cured at room temperature (15° to 30° C.).

As the scope of useful polyester resin systems is extensive, the type of promoter which can be used in those systems is also extensive. A few exemplary promoters are given in the following paragraphs.

One of the promoter types which can be used in the polyester resin systems is a cobalt salt which is capable of being dissolved in the resinous composition. Suitable soluble cobalt octoate or any other higher fatty acid salt of cobalt. The amount of cobalt salt can be varied from about 0.001 to 0.3 percent of the salt calculated as dissolved metallic cobalt based on the total weight of the resin components, catalyst and promoter mixture employed. On the same basis, the preferred amount of cobalt metal ranges from about 0.05 to 0.15 percent.

The vanadium promoters disclosed in U.S. Pat. No. 3,333,021 are useful.

Another promoter type material is a variety of amine promoters. Suitable amine promoters are disclosed in U.S. Pat. No. 2,480,928. The promoters are described therein as tertiary monoamines which contain attached to the nitrogen atom two functionally aliphatic radicals selected from the group consisting of alkyl hydrocarbons, hydroxy-substituted alkyl hydrocarbons and aralkyl hydrocarbons and one aromatic radical selected from the group consisting of aryl hydrocarbons, azo-substituted aryl hydrocarbons, amino-substituted aryl hydrocarbons, and aldehyde-substituted aryl hydrocarbons, and salts thereof. Specific examples of this class are the following: dimethylaniline, diethylaniline, di-n-propylaniline, dimethyl-p-toluidine, dimethyl-o-toluidine, dimethyl-alpha-naphthylamine, methyl benzyl aniline, p-dimethylaminoazobenzene, N,N-dimethyl - m - aminophenol, p-dimethylaminophenyl oxalate, p-dimethylaminobenzaldehyde, p-dimethylaminophenyl acetate, and p-hydroxy-N,N-di(beta hydroxyethyl)aniline. Additionally, the promoter can be a tertiary alkyl amine, a hydroxy alkyl amine or acid salt thereof as a promoter. Exemplary of these types of promoters are diethylmethylolamine, triethylamine, triisopropylamine, trimethylamine, tri-isopropanolamine, ethyl diethanolamine hydrochloride and the like. Tertiary polyamines are also effective for use in the instant manner, such as for example, tetramethylbutanediamine. The amount of amine promoter useful in the practice of this invention varies between about 0.05 to 1.0 percent based on the resin components, catalyst and promoter. These amine promoters can be used in conjunction with the above cobalt promoters.

The polyester resin systems of this invention can also contain other compatible additives, such as fillers (silica, carbon black), etc., dyes reinforcing materials (asbestos, chopped glass fibers), etc.

The resin systems stabilized with agents of this invention are readily curable, for example, when excess peroxide catalysts and cobalt promoter are employed to destroy, neutralize, or inactivate the inhibitors. The preferred catalysts are disclosed in copending application Ser. No. 782,734 (Disclosure No. 2,693), filed Dec. 10, 1968, inventors: D. A. Daniels, R. L. Orem and E. W. Lard. For example, the preferred catalysts for curing the resin systems include a ketone peroxide, such as, Lupersol 224, Lupersol DDM, and an organic nonketonic diperoxide, such as Lupersol 256 [which is 2,5-dimethyl-2,5-bis(2-ethylhexanoylperoxy)hexane]. The amount of each preferred catalyst component must be based on the amount of each stabilizer present. In general, the non-ketonic diperoxide can be present in an amount between about 2 to about 3 percent by weight based upon the amount of resin components (monomers, etc.) present and the ketone peroxide can be present in an amount between about 2 to about 6 percent by weight based upon the amount of resin components (monomers, etc.) present. The amount of cobalt promoter present can be between about 0.2 to about 0.4 mole percent based upon the amount of resin components (monomers, etc.) present.

To add structural body to the cured polymer resins, materials, such as, styrene, vinyl toluene, α-methylstyrene, dimethylstyrene, the methyl-α-methylstyrenes, α-bromostyrene, β-bromostyrene, α-chlorostyrene, β-chlorostyrene, diallylphthate, vinyl acetate, methyl methacrylate and divinylbenzene, can be added to the uncured polymer resins so that they can be copolymerized with the other monomer components.

One (1.0) mole percent is 0.01 mole per one hundred grams of resin. Weight percent or percent by weight as used throughout this application, unless otherwise specifically stated, is defined as weight in grams per hundred grams of resin.

The following examples illustrate this invention. All percentages and parts therein are by weight, unless otherwise stated.

EXAMPLE 1

Polyester composition A was prepared by admixing and heating (as hereinbefore described) 10 moles of diethylene glycol, 4 moles of maleic anhydride, 5 moles of chlorendic anhydride, 1 mole of adipic acid, 10 moles of styrene, and about 0.02 mole of cobalt octoate. There was a total halogen content of about 25 percent.

EXAMPLE 2

Polyester composition B was prepared by admixing and heating (as hereinbefore described) 10 moles of diethylene glycol, 5 moles of maleic anhydride, 5 moles of chlorendic anhydride, and 10 moles of styrene. There was a total halogen content of about 25 percent. (A cobalt compound, or other catalyst, must be placed in the composition before it can be cured after storage.)

EXAMPLE 3

Polyester composition C was prepared by admixing and heating (as hereinbefore described) 10 moles of diethylene glycol, 5 moles of maleic anhydride, 5 moles of chlorendic anhydride, 10 moles of styrene, and about 0.02 mole of cobalt octoate. There was a total halogen content of about 25 percent.

EXAMPLE 4

Polyester composition D was prepared by admixing and heating (as hereinbefore described) 10 moles of diethylene glycol, 6.2 moles of maleic anhydride, 1.2 moles of tetrabromophthalic anhydride, 2.6 moles of phthalic anhydride and 10 moles of styrene. There was a total halogen content of about 9 to about 11 percent. (A cobalt compound, or other catalyst, must be placed in the composition before it can be cured after storage.)

EXAMPLE 5

Polyester composition E was prepared by admixing and heating (as hereinbefore described) 10 moles of diethylene glycol, 6.2 moles of maleic anhydride, 1.2 moles of tetrabromophthalic anhydride, 2.6 moles of phthalic anhydride, 10 moles of styrene, and about 0.02 mole of cobalt octoate. There was a total halogen content of about 9 to about 11 percent.

EXAMPLE 6

Polyester B was stored (immediately after preparation) at a tempertaure of 70° C. The gel time for the composition was 9±0.5 days.

EXAMPLE 7

Polyester B was stored (immediately after preparation) at a temperature of 25° C. The gel time for the composition was 750±50 days. (This is an extrapolated value which was obtained by the extrapolation technique given above.)

EXAMPLE 8

2-hydroxy-1,4-naphthoquinone (1.0 mole percent) was admixed with polyester B, and the admixture was stored (immediately after preparation) at a temperature of 70° C. The gel time for the composition was 155±3 days.

EXAMPLE 9

2-hydroxy-1,4-naphthoquinone (1.0 mole percent) was admixed with polyester B, and the admixture was stored (immediately after preparation) at a temperature of 25° C. The gel time for the composition was 12,000±120 days. (This is an extrapolated value which was obtained by the extrapolation technique given above.)

EXAMPLE 10

2-hydroxy-1,4-naphthoquinone (1.0 mole percent) was admixed with polyester C, and the admixture was stored (immediately after preparation) at a temperature of 70° C. The gel time for the composition was 124±10 days.

EXAMPLE 11

2-hydroxy-1,4-naphthoquinone (1.0 mole percent) was admixed with polyester C, and the admixture was stored (immediately after preparation) at a temperature of 70° C. The gel time for the composition was 124±10 days.

EXAMPLE 12

Polyester A was stored (immediately after preparation) at a temperature of 70° C. The gel time for the composition was 11±0.5 days.

EXAMPLE 13

Polyester A was stored (immediately after preparation) at a temperature of 25° C. The gel time for the composition was 900±0.5 days. (This is an extrapolated value which was obtained by the extrapolation technique given above.)

EXAMPLE 14

2-hydroxy-1,4-naphthoquinone (1.0 mole percent) was admixed with polyester A, and the admixture was stored (immediately after preparation) at a temperature of 70° C. The gel time for the composition was 200±1 days.

EXAMPLE 15

2-hydroxy-1,4-naphthoquinone (1.0 mole percent) was admixed with polyester A, and the admixture was stored (immediately after preparation) at a temperature of 25° C. The gel time for the composition was 18,000±200 days. (This is an extrapolated value which was obtained by the extrapolation technique given above.)

EXAMPLE 16

Polyester D was stored (immediately after preparation) at a temperature of 70° C. The gel time for the composition was 9±0.5 days.

EXAMPLE 17

Polyester D was stored (immediately after preparation) at a temperature of 25° C. The gel time for the composition was 750±50 days. (This is an extrapolated value which was obtained from the extrapolation technique given above.)

EXAMPLE 18

2-hydroxy-1,4-naphthoquinone (1.0 mole percent) was admixed with polyester D, and the admixture was stored (immediately after preparation) at a temperature of 70° C. The gel time for the composition was 134±10 days.

EXAMPLE 19

2-hydroxy-1,4-naphthoquinone (1.0 mole percent) was admixed with polyester D, and the admixture was stored (immediately after preparation) at a temperature of 25° C. The gel time for the composition was 11,000±150 days.

EXAMPLE 20

Polyester E was stored (immediately after preparation) at a temperature of 70° C. The gel time for the composition was 8±0.5 days.

EXAMPLE 21

Polyester E was stored (immediately after preparation) at a temperature of 25° C. The gel time for the composition was 700±30 days. (This is an extrapolated value which was obtained by the extrapolation technique given above.)

EXAMPLE 22

2-hydroxy-1,4-naphthaquinone (1.0 mole percent) was admixed with polyester E, and the admixture was stored (immediately after preparation) at a temperature of 70° C. The gel time for the composition was 124±10 days.

EXAMPLE 23

2-hydroxy-1,4-naphthoquinone (1.0 mole percent) was admixed with polyester E, and the admixture was stored (immediately after preparation) at a temperature of 25° C. The gel time for the composition was 10,000±120 days. (This is an extrapolated value which was obtained by the extrapolation technique given above.)

EXAMPLE 24

5-hydroxy-1,4-naphthoquinone (0.5 mole percent) was admixed with polyester B, and the admixture was stored (immediately after preparation) at a temperature of 70° C. The gel time for the composition was 100±10 days.

EXAMPLE 25

2-hydroxy-3-methyl-1,4-naphthoquinone (0.2 mole percent) was admixed with polyester B, and the admixture was stored (immediately after preparation) at a temperature of 70° C. The gel time for the composition was 50±5 days.

EXAMPLE 26

5-hydroxy-2-methyl-1,4-naphthoquinone (0.8 mole percent) was admixed with polyester B, and the admixture was stored (immediately after preparation) at a temperature of 70° C. The gel time for the composition was 90±9 days.

EXAMPLE 27

2,3-dihydroxy-1,4-naphthoquinone (1.0 mole percent) was admixed with polyester B, and the admixture was stored (immediately after preparation) at a temperature of 125° C. The gel time for the composition was 0.95±0.05 day.

EXAMPLE 28

2,5-dihydroxy-1,4-naphthoquinone (1.0 mole percent) was admixed with polyester B, and the admixture was stored (immediately after preparation) at a temperature of 70° C. The gel time for the composition was 100±5 days.

EXAMPLE 29

2,6-dihydroxy-1,4-naphthoquinone (1.0 mole percent) was admixed with polyester B, and the admixture was stored (immediately after preparation) at a temperature of 70° C. The gel time for the composition was 95±5 days.

EXAMPLE 30

2,7-dihydroxy-1,4-naphthoquinone (1.0 mole percent) was admixed with polyester B, and the admixture was stored (immediately after preparation) at a temperature of 70° C. The gel time for the composition was 105±5 days.

EXAMPLE 31

2,8-dihydroxy-1,4-naphthoquinone (1.0 mole percent) was admixed with polyester B, and the admixture was stored (immediately after preparation) at a tempertaure of 70° C. The gel time for the composition was 110±10 days.

EXAMPLE 32

5,6-dihydroxy-1,4-naphthoquinone (1.0 mole percent) was admixed with polyester B, and the admixture was stored (immediately after preparation) at a temperature of 70° C. The gel time for the composition was 92±5 days.

EXAMPLE 33

5,8-dihydroxy-1,4-naphthoquinone (1.0 mole percent) was admixed with polyester B, and the admixture was stored (immediately after preparation) at a temperature of 70° C. The gel time for the composition was 97±2.5 days.

EXAMPLE 34

2,8-dihydroxy-3-methyl-1,4-naphthoquinone (1.0 mole percent) was admixed with polyester B, and the admixture was stored (immediately after preparation) at a temperature of 70° C. The gel time for the composition was 120±10 days.

EXAMPLE 35

2,5,7-trihydroxy-1,4-naphthoquinone (1.0 mole percent) was admixed with polyester B, and the admixture was stored (immediately after preparation) at a temperature of 70° C. The gel time for the composition was 100±3 days.

EXAMPLE 36

2,5,8-trihydroxy-1,4-naphthoquinone (1.0 mol percent) was admixed with polyester B, and the admixture was stored (immediately after preparation) at a temperature of 70° C. The gel time for the composition was 99±2 days.

EXAMPLE 37

2,5,8-trihydroxy-3-methyl-1,4-naphthoquinone (1.0 mole percent) was admixed with polyester B, and the admixture was stored (immediately after preparation) at a temperature of 70° C. The gel time for the composition was 97±4 days.

EXAMPLE 38

2,3,5,8-tetrahydroxy-1,4-naphthoquinone (1.0 mole percent) was admixed with polyester B, and the admixture was stored (immediately after preparation) at a temperature of 60° C. The gel time for the composition was 200±10 days.

EXAMPLE 39

2,3,5,6,8-pentahydroxy-7-ethyl-1,4-naphthoquinone (1.0 mole percent) was admixed with polyester B, and the admixture was stored (immediately after preparation) at a temperature of 70° C. The gel time for the composition was 91±1 days.

EXAMPLE 40

An uncured polyester resin system containing 3.7 weight percent Lupersol 224, 2.7 weight percent Lupersol 256, and 93.6 weight percent polyester composition (including the styrene and inhibitor) similar to the one of Example 11. Lupersol 224 is a trade designation for a solution of 3,5-dimethyl-3,5-dihydroxy-1,2-peroxycyclopentane (30 percent purity), having an active oxygen content of 4.0 percent.

The polyester resin system was cured by heating the system between 77° and 180° F. for 25 minutes. The curing is an exothermic autoaccelerative reaction. The resin system gelled after 15 minutes and the peak temperature was 350° F. A well-cured polyester resin was obtained. After 24 hours, the flexural modulus was 350,000 p.s.i.

EXAMPLE 41

Example 40 was repeated, except that the polyester composition (including inhibitor) was similar to the one of Example 8; 0.02 mole of cobalt octoate was admixed before curing. A well-cured polyester resin was obtained with strength equal to that of the cured resin of Example 40.

EXAMPLE 42

2-hydroxy-1,4-naphthaquinone (0.5 mole percent) and 5-hydroxy-1,4-naphthaquinone (0.5 mole percent) were admixed with polyester B, and the admixture was stored (immediately after preparation) at a temperature of 40° C. The gel time for the composition was 420±10 days.

EXAMPLE 43

An uncured poleyster resin system, containing 18.1 weight percent fiber glass (as three layers of glass fabric), 1.5 weight percent cobalt octoate solution (12 percent cobalt), 3.7 weight percent 3,5-dimethyl-3,5-dihydroxy-1,2-peroxycyclopentane solution (30 parts dissolved in 70 parts of propylene glycol), 2.7 weight percent Lupersol 256, and 74.0 weight percent of the polyester resin components (including styrene) of Example 8. The uncured polyester resin system also contained 1.0 mole percent 2-hydroxy-1,4-naphthoquinone (inhibitor), based upon the resin. The polyester was then cured as in Example 40.

EXAMPLE 44

Example 43 was repeated, except that the solvent in the 1,2-peroxycyclopentane solution was hexylene glycol. A well-cured resin was obtained.

EXAMPLE 45

Example 43 was repeated, except that the solvent in the 1,2-peroxycyclopentane solution was a 50/50 mixture of water and hexylene glycol. A well-cured resin was obtained.

EXAMPLE 46

Example 456 was repeated, except that the 1,2-peroxycyclopentane was replaced with:

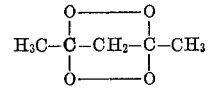

A well-cured resin was obtained.

EXAMPLE 47

Example 22 was repeated, except that polyester resin B contained propylene glycol instead of diethylene glycol. The gel time for the composition was 124±10 days (storage temperature was 70° C.).

Lupersol DDM is a solution comprising 60% methyl ethyl ketone peroxides and the hydroperoxides in dimethyl phthalate. Lupersol 224 is a solution comprising 30% 3,5-dimethyl-3,5-dihydroxy-1,2-peroxycyclopentane in triethyl phosphate. Lupersol 256 is a difunctional polyester catalyst designed especially for elevated temperature applications comprising at least 90% 2,5-dimethyl-2,5-bis (2-ethyl hexanoylperoxy)hexane and having at least 6.69% available oxygen.

EXAMPLE 48

Example 43 was repeated, except that the 1,2-peroxycyclopentane solution was comprised of 30 percent 3,5-dimethyl-3,5-dihydroxy-1,2-peroxycyclopentane, 12 percent water, 29 percent triethyl phosphate and 29 percent N-alkyl-2-pyrrolidinone. A well-cured resin was obtained.

It is claimed:

1. A stabilized uncured burn resistant polyester resin composition consisting essentially of:
   (a) an unsaturated polyester of; (i) a polyhydric alcohol selected from a first group consisting of ethylene glycol, diethylene glycol, propylene glycol, and a polyethylene glycol having a molecular weight between 300 and 4000; (ii) a member selected from a second group consisting of chlorendic acid and chlorendic anhydride; (iii) a member selected from a third group consisting of maleic acid, fumaric acid, itaconic acid, and aconitic acid or an anhydride of the third group member; and (iv) a member selected from a fourth group consisting of tricarballyic acid, citric acid, succinic acid, adipic acid, sebacic acid, azelaic acid, phthalic acid, and terephthalic acid or an anhydride of the fourth group member, the chlorine content of the stabilized polyester resin composition being 25 to 30%, the mole ratio of the third group member to the fourth group member being 1:0.25–12;
   (b) an ethylenically unsaturated monomer selected from a fifth group consisting of styrene, vinyl toluene, α - methylstyrene, dimethylstyrene, the methyl-α-methylstyrenes, α-bromostyrene, β-bromostyrene, α - chlorostyrene, β - chlorostyrene, diallylphthalate, vinyl acetate, methyl methacrylate, and divinylbenzene, the fifth group member constituting about 10–45% of the polyester resin composition; and
   (c) an inhibitor selected from a sixth group consisting of; 2-hydroxy-1,4-naphthoquinone, 5 - hydroxy-1,4-naphthoquinone, 2 - hydroxy-3-methyl-1,4-naphthoquinone, 5 - hydroxy-2-methyl-1,4-naphthoquinone, 2,3 - dihydroxy-1,4-naphth-1,4-naphthoquinone, 2,5-dihydroxy-1,4-naphthoquinone, 2,6-dihydroxy - 1,4-naphthoquinone 27 - dihydroxy-1,4-naphthoquinone, 2,8-dihydroxy-1,4 - naphthoquinone, 5,6 - dihydroxy-1,4-naphthoquinone, 5,8 - dihydroxy - 1,4 - naphthoquinone, 2,8-dihydroxy - 3 - methyl - 1,4 - naphthoquinone, 2,5,7-trihydroxy-1,4-naphthoquinone, 2,5,-8-trihydroxy - 1,4-naphthoquinone, 2,5,8-trihydroxy-3-methyl-1,4-naphthoquinone, 2-3,5,8-tetrahydroxy-1,4-naphthoquinone, and 2,3,5,6,8-pentahydroxy-7- ethyl-1,4-naphthoquinone, said inhibitor being admixed with isopropanol the sixth group member being present in an amount between 0.5 and 1.0 mole percent based on the fifth group member and the isopropanol being present in an amount between 0.1 and 3.5 mole percent based on the fifth group member, the stabilized uncured polyester resin composition having a gel time in excess of 80 days at 70° C.

2. The composition of claim 1 in which the fifth group member is styrene.

3. The composition of claim 1 in which the fifth group member constitutes about 20–40% of the polyester resin composition.

4. The composition of claim 1 in which the inhibitor is 2-hydroxy-1,4-naphthoquinone.

5. The composition of claim 1 in which the inhibitor is 5-hydroxy-1,4-naphthoquinone.

6. A stabilized uncured burn resistant polyester resin composition consisting essentially of:
  (a) an unsaturated polyester of; (i) a polyhydric alcohol selected from a first group consisting of ethylene glycol, diethylene glycol, propylene glycol, and a polyethylene glycol having a molecular weight between 300 and 4000; (ii) a member selected from a second group consisting of tetrabromophthalic acid and tetrabromophthalic anhydride; (iii) a member selected from a third group consisting of maleic acid, fumaric acid, itaconic acid, and aconitic acid or an anhydride of the third group member; and (iv) is a member selected from a fourth group consisting of tricarballyic acid, citric acid, succinic acid, adipic acid, sebacic acid, azelaic acid, phthalic acid, and terephthalic acid or an anhydride of the fourth group member, the bromine content of said composition being about 10%, the mole ratio of the third group member to the fourth group member being 1:0.25–12;
  (b) An ethylenically unsaturated monomer selected from a fifth group consisting of styrene, vinyl toluene, α - methylstyrene, dimethylstyrene, the methyl-α-methylstyrenes, α-bromostyrene, β-bromostyrene, α-chlorostyrene, β-chlorostyrene, diallylphthalate, vinyl acetate, methyl methacrylate, and divinylbenzene, the fifth group member constituting about 10—45% of the polyester resin composition; and
  (c) an inhibitor selected from a sixth group consisting of; 2-hydroxy-1,4-naphthoquinone, 5 - hydroxy-1,4-naphthoquinone, 2-hydroxy-3-methyl - 1,4-naphthoquinone, 5-hydroxy-2-methyl-1,4-naphthoquinone, 2,3-dihydroxy-1,4-naphth - 1,4-naphthoquinone, 2,5-dihydroxy - 1,4-naphthoquinone, 2,6-dihydroxy-1,4-naphthoquinone, 2,7-dihydroxy-1,4-naphthoquinone, 2,8 - dihydroxy-1,4-naphthoquinone, 5,6-dihydroxy-1,4-naphthoquinone, 5,8-dihydroxy - 1,4 - naphthoquinone, 2,8-dihydroxy - 3 - methyl-1,4-naphthoquinone, 2,5,7-trihydroxy - 1,4 - naphthoquinone, 2-5,8 - trihydroxy - 1,4 - naphthoquinone, 2,5,8-trihydroxy - 3 - methyl - 1,4 - naphthoquinone, 2,3,5,8-tetrahydroxy - 1,4 - naphthoquinone, and 2,3,5,6,8-pentahydroxy - 7 - ethyl - 1,4 - naphthoquinone, said inhibitor being admixed with isopropanol, the sixth group member being present in an amount between 0.5 and 1.0 mole percent based on the fifth group member and the isopropanol being present in an amount between 0.1 and 3.5 mole percent based on the fifth group member, the stabilized uncured polyester resin composition having a gel time in excess of 80 days at 70° C.

7. The composition of claim 6 in which the fifth group member is styrene.

8. The composition of claim 6 in which the fifth group member constitutes about 20–40% of the polyester resin composition.

9. The composition of claim 6 in which the inhibitor is 2-hydroxy-1,4-naphthoquinone.

10. The composition of claim 6 in which the inhibitor is 5-hydroxy-1,4-naphthoquinone.

References Cited

UNITED STATES PATENTS

| | | | |
|---|---|---|---|
| 2,610,168 | 9/1952 | Anderson | 260—864 |
| 2,779,701 | 1/1957 | Robitschek et al. | 154—43 |
| 3,300,544 | 1/1967 | Parker | 260—866 |
| 3,377,407 | 4/1968 | Kressin et al. | 260—863 |

OTHER REFERENCES

Lawrence, Polyester Resins, 1960, pp. 30–32.

WILLIAM H. SHORT, Primary Examiner

R. J. KOCH, Assistant Examiner

U.S. Cl. X.R.

260—40, 45.95, 863, 864